J. Y. HUMPHREY.
Lamp Chimney.
No. 29,172.
Patented July 17, 1860.
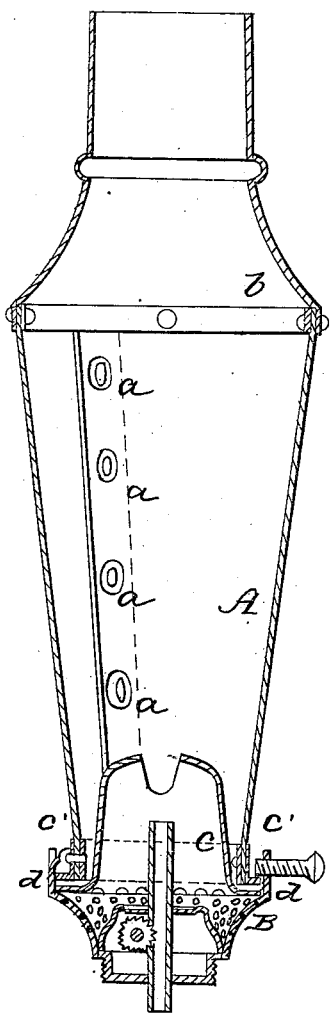

UNITED STATES PATENT OFFICE.

JAMES Y. HUMPHREY, OF PHILADELPHIA, PENNSYLVANIA.

MICA CHIMNEY FOR LAMPS.

Specification of Letters Patent No. 29,172, dated July 17, 1860.

*To all whom it may concern:*

Be it known that I, JAMES Y. HUMPHREY, of Philadelphia, in the county of Philadelphia and State of Pennsylvania, have invented a new and Improved Chimney for Lamps; and I do hereby declare that the following is a full, clear, and exact description of the same, reference being had to the annexed drawings, making a part of this specification, said drawing being a sectional elevation of my invention.

All burning fluids, which are burned in lamps for illuminating purposes, and contain an excess of carbon, require to have a proportionate amount of oxygen to support combustion and produce a proper illuminating flame. This supply of oxygen has hitherto been obtained by means of a draft of air produced by a glass chimney encompassing the flame, the heat of the flame rarefying the air within the chimney, and causing a current to pass through it which current impinges against the flame.

In order to avoid annealing the glass chimneys and save expense, they are made extremely thin so as not to break by a sudden expansion caused by the heat of the flame—the thin glass being heated quite equally throughout. This extreme thinness of the glass, although serving in a great degree to prevent fracture by heat, still renders the chimneys extremely liable to break by the slightest jar and concussion, and the breaking of the glass chimneys renders the use of coal oil, and other hydro-carbons which contain an excess of carbon, and require their use, a rather expensive article. In order to obviate this difficulty I construct a chimney of mica and metal in the following manner. A thin sheet of mica A, is bent in tubular form and connected at its edges by rivets $a$, and bound at its ends by metal rings $c$, $c'$, $g$, $g'$, as shown clearly in the drawings. The outer, lower, ring $c'$, is provided with a horizontal flanch $d$, so as to serve as a support or base for the chimney to rest upon while it is applied to the lamp. The upper, outer, ring extends up some distance above the top of the mica tube A, and terminates in a truncated cone as represented. This cone may be transparent or opaque. By thus constructing the chimney the use of glass can be dispensed with, and equal if not greater advantages, so far as transparency is concerned, are obtained and all the losses from breakage &c., obviated.

The precise shape or form of the mica tube is quite unimportant so far as the manufacture of them is concerned. They may be made of inverted conical form, as shown in the drawing, equally as well as of cylindrical form or an upright conical form.

The mica will not, of course, be affected by the heat of the flame and will with ordinary care last indefinitely. They may be manufactured quite economically and will in the end not only be far less expensive than the glass chimneys, but the trouble and embarrassment attending the latter, the care requisite in handling, cleaning, etc., fully avoided.

What I claim as my invention and desire to secure by Letters Patent, is—

The combination of the tapering cap $b$, with the mica tube A, $a$, and metal rings or supports $c$, $c'$, $g$, $g'$—as and for the purposes described.

JAS. Y. HUMPHREY.

Witnesses:
   WM. H. BUTLER,
   AMOS HORNING.